United States Patent [19]
Rawson et. al.

[11] Patent Number: 5,226,343
[45] Date of Patent: Jul. 13, 1993

[54] ULTRASONIC CUTTING APPARATUS

[75] Inventors: Francis F. H. Rawson, Paul S. Morris, both of Leicester, Great Britain

[73] Assignee: Nestec S.A., Vevey, Switzerland

[21] Appl. No.: 833,627

[22] Filed: Feb. 7, 1992

Related U.S. Application Data

[63] Continuation of Ser. No. 357,176, May 25, 1989, abandoned.

[30] Foreign Application Priority Data

Jun. 3, 1988 [GB] United Kingdom ............... 8813089

[51] Int. Cl.⁵ .................. B26D 1/45; B26D 7/08
[52] U.S. Cl. ...................... 83/508.3; 83/701
[58] Field of Search .............. 83/13, 508.3, 701; 51/59 SS

[56] References Cited

U.S. PATENT DOCUMENTS 3,031,804  5/1962  Thatcher et al. ............... 51/59 SS
3,471,724  10/1969  Balamuth ..................... 51/59 SS
3,742,796  7/1973  McMillan ...................... 83/508.3

FOREIGN PATENT DOCUMENTS 923804  5/1984  U.S.S.R. ......................... 83/701

Primary Examiner—Hien H. Phan
Attorney, Agent, or Firm—Vogt & O'Donnell

[57] ABSTRACT

Materials are cut by ultrasonically vibrating a cutting blade transverse to the plane of passage of the blade through the material and passing the vibrated blade through the material. An ultrasonic cutting device combines one or more cutting blades with an ultrasonic vibrating de ice which vibrates the blades transverse to the planes of passage of the blades through the material when the cutting device is in operation.

3 Claims, 3 Drawing Sheets

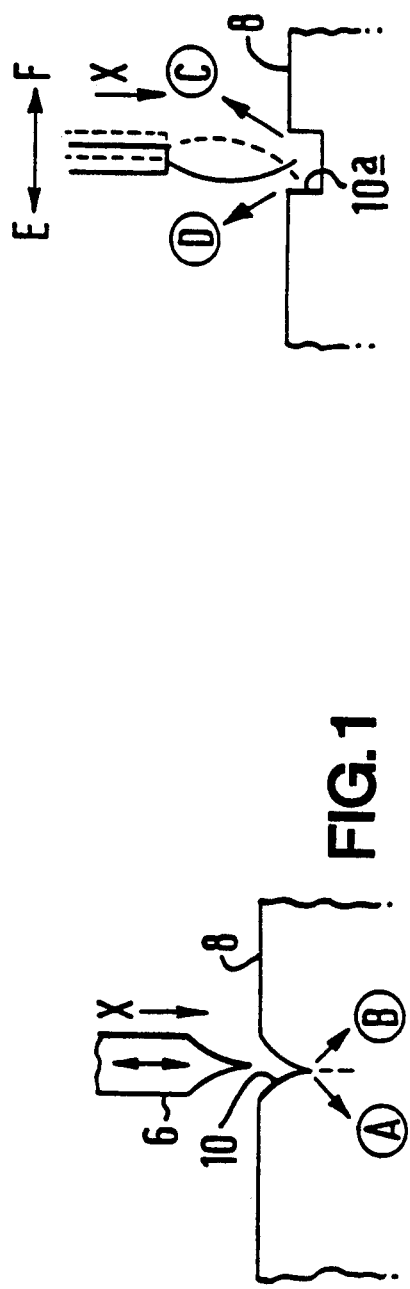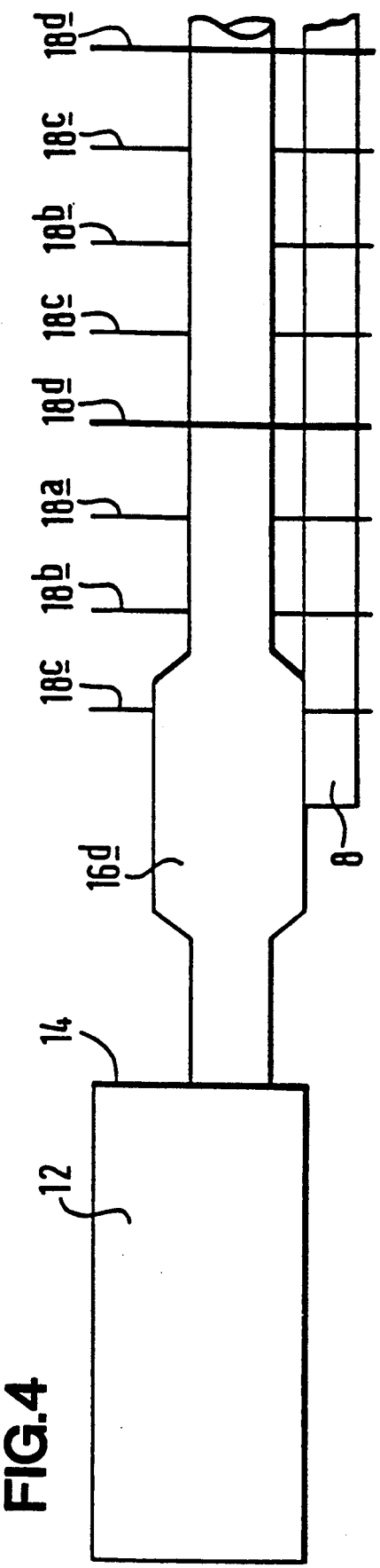

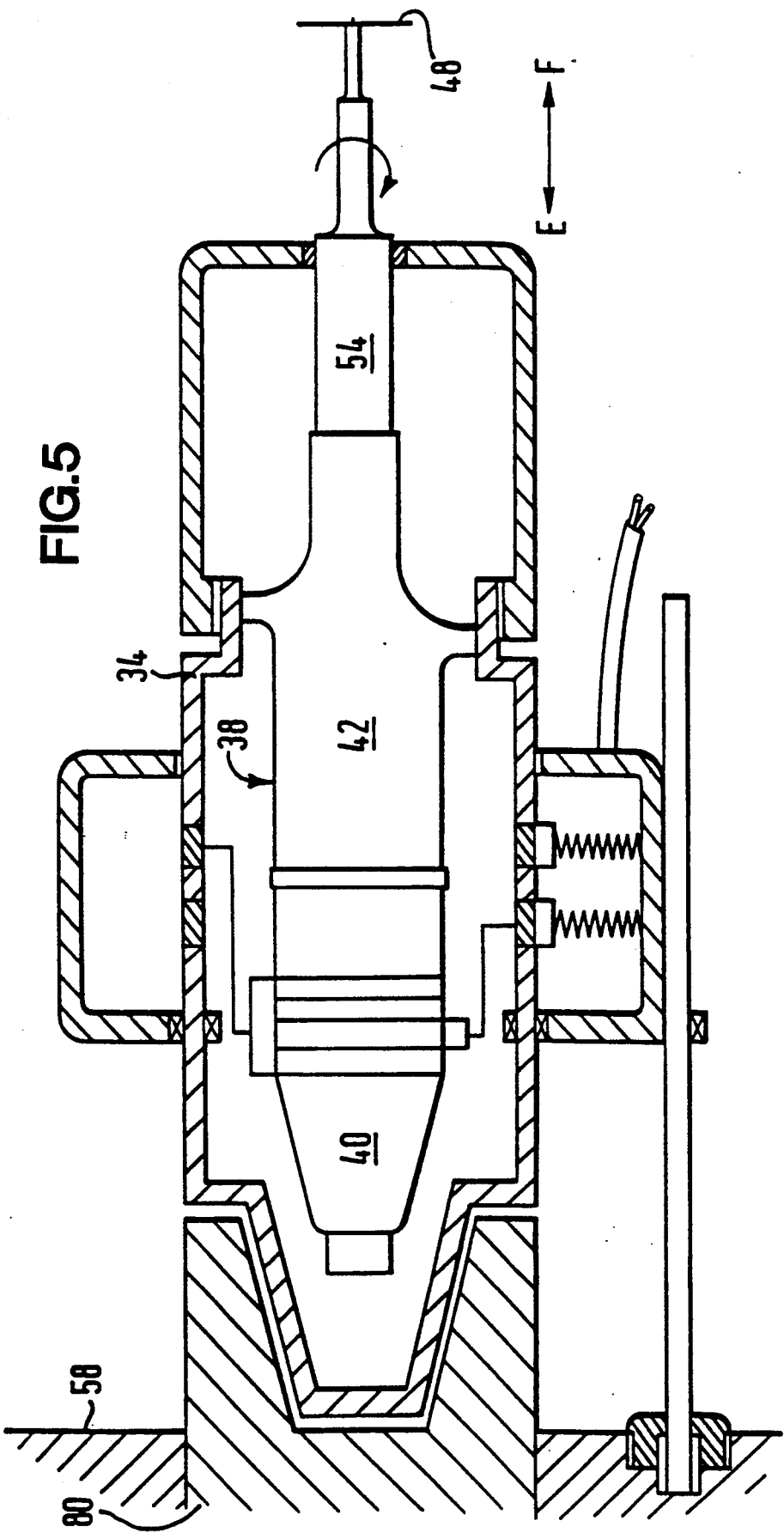

ULTRASONIC CUTTING APPARATUS

CROSS REFERENCE TO RELATED APPLICATION

This Application is a continuation application of application Ser. No. 07/357,176, filed May 25, 1989 now abandoned.

BACKGROUND OF THE INVENTION

The present invention relates to ultrasonic cutting devices and improved methods of cutting.

In prior art ultrasonic cutting devices and methods, a cutting blade is connected to an ultrasonic vibrating device such that the cutting blade and the longitudinal axis of vibrations created by the vibrating device are aligned in the same plane. In operation, the cutting blade is passed through the workpiece to be cut while the blade is vibrated in the plane in which it moves through the workpiece.

Difficulty is experienced using such cutting devices and methods, in that the depth of cut which is attainable is limited. For this reason, ultrasonic cutting has in general been limited to thin articles, such as paper, cloth and thin plastic sheets. A significant problem exists in cutting blocks of substantial depth, and in providing a number of parallel cuts simultaneously. Difficulties are also encountered when cutting brittle workpieces, such as honeycombed or crystalline materials.

SUMMARY OF THE INVENTION

According to the ultrasonic cutting method of present invention, a cutting blade is passed through a workpiece while the cutting blade is ultrasonically vibrated transverse to the plane of passage of the blade through the workpiece. The cutting blade is vibrated back and forth, transverse to the plane in which it moves through the workpiece, thereby effecting a removal of the material comprising the workpiece along the line of the cut.

In a preferred cutting method of the present invention, the cutting blade is passed through the workpiece while vibrating the blade perpendicularly, i.e., at right angles, to the plane of passage of the blade through the workpiece. Preferably, the cutting blade is connected to an ultrasonic vibrating device at an anti-node. According to an alternative method of the present invention the vibrated cutting blade is simultaneously rotated while the blade is passed through the workpiece.

According to a further embodiment of the present invention, a plurality of cutting blades are simultaneously passed through the material while ultrasonically vibrating the blades transverse to the respective planes of passage of the blades through the material.

The ultrasonic cutting device of the present invention comprises a cutting blade and an ultrasonic vibrating device connected to the cutting blade for vibrating the cutting blade in a direction transverse to a plane of passage of the blade through a material when the cutting device is in operation. The cutting blade is connected to the ultrasonic vibrating device such that in operation it is vibrated in a direction transverse to the longitudinal axis of vibrations propagated by the ultrasonic vibrating device.

Preferably, the ultrasonic vibrating device vibrates the cutting blade perpendicularly, i.e. at right angles, to the plane of passage of the blade through the material longitudinal axis of vibrations generated by the vibrating device. The cutting blade is thus connected to the ultrasonic vibrating device such that in operation it is vibrated at right angles to the longitudinal axis of vibrations propagated by the ultrasonic vibrating device.

The ultrasonic cutting device of the present invention may also comprise means for rotating the vibrated cutting blade in the plane in which the blade is passed through the workpiece. In operation, the cutting blade is simultaneously rotated in its plane of passage through the material and vibrated transverse to its plane of passage through the material.

In another embodiment of the ultrasonic cutting device of the present invention, the ultrasonic vibrating device comprises a vibrating means and at least one support member connected to the vibrating means, and a plurality of cutting blades lying in parallel planes are connected to the support member. It is desirable that the blades be connected to the support member at anti-nodes of the support member. Preferably, the ultrasonic vibrating device comprises a plurality of support members, to which are connected a plurality of cutting blades, at least one of the support members being secured to the vibrating means through the intermediary of node/anti-node displacement means. Preferably, the vibrating means to which the support members are secured is in the form of a horn, having a surface which is vibrated at ultrasonic frequency.

The ultrasonic cutting methods and devices of the present invention are illustrated in the accompanying drawings.

BRIEF DESCRIPTION OF THE DRAWINGS

FIG. 1 is a schematic view of a prior art ultrasonic cutting device in use in cutting an article.

FIG. 2 is a schematic view of the cutting device of the present invention in use in cutting an article.

FIG. 4 is a side view of the embodiment of the cutting device of the present invention shown in FIG. 3.

FIG. 5 is a side view of an embodiment of the cutting device of the present invention in which the cutting blade is simultaneously vibrated and rotated.

DETAILED DESCRIPTION OF THE DRAWINGS

Figure 3:
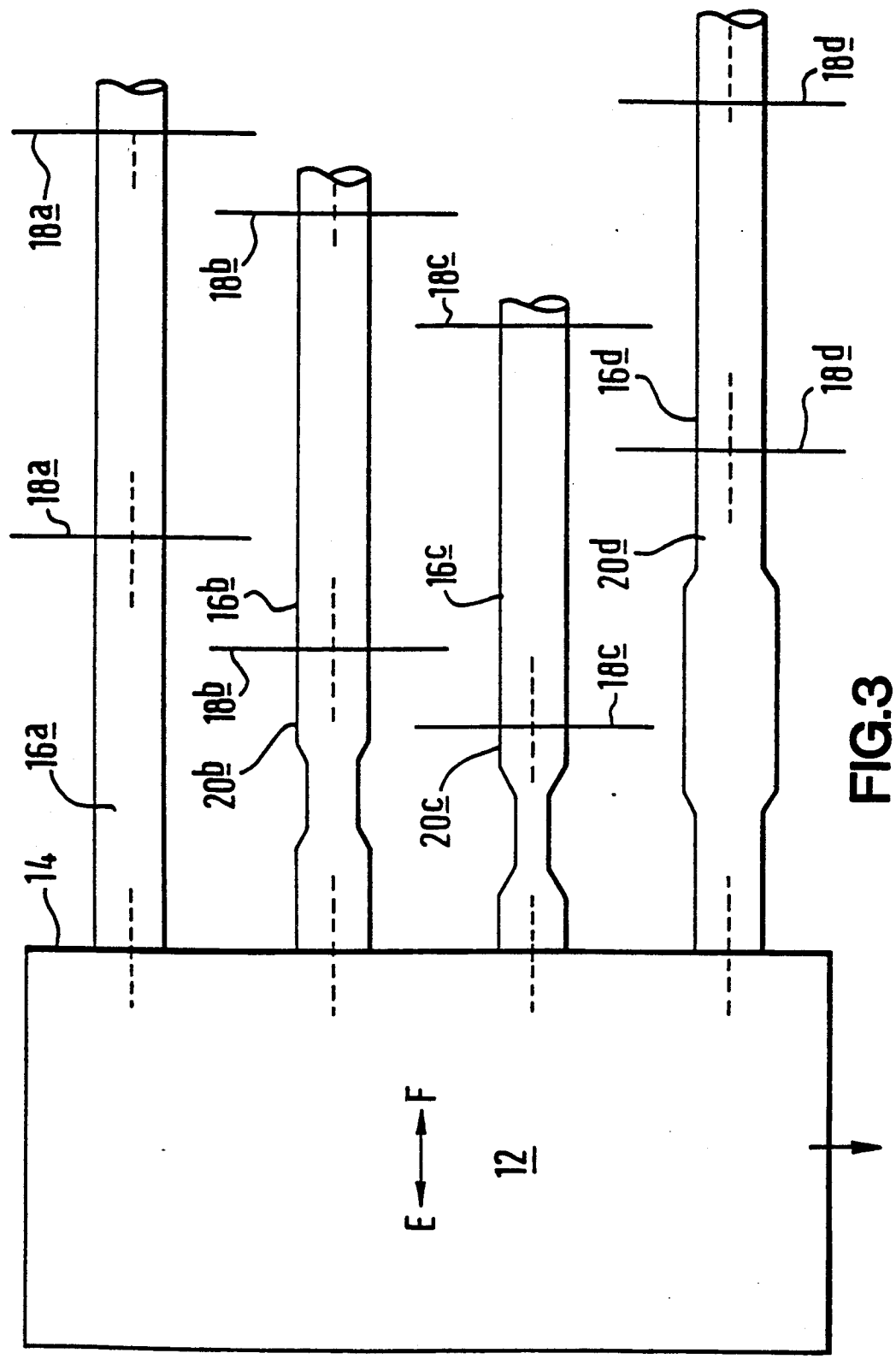
FIG. 3 is a plane view of a preferred embodiment of the cutting device of the present invention.

FIG. 1 illustrates a prior art ultrasonic cutting device and method, in which a cutting blade is vibrated at ultrasonic frequency in the plane containing the blade. The cutting blade is vibrated in the plane in which it passes through the workpiece. As shown in FIG. 1, the vibrated blade is moved in the direction X toward the workpiece 8 to be cut, and penetrates the workpiece 8, opening a cut 10, which subjects the workpiece 8 to compressive vibrations in the directions A and B. When the workpiece to be cut is of a friable or brittle material, these compressive vibrations can result in the production of a fractured cut.

The ultrasonic cutting device and method of the present invention are broadly illustrated in FIG. 2, wherein the cutting blade is vibrated in the direction E-F, transverse to the direction X in which the blade moves toward and penetrates the workpiece 8 to be cut. As shown in FIG. 2, as the vibrated cutting blade penetrates and passes into the workpiece 8 to be cut, it effects a removal of the material comprising the workpiece C and D along the line of the cut 10a. Thus, the ultrasonic cutting method of the present invention comprises ultrasonically vibrating a cutting blade transverse to the plane of passage of the blade through the material to be cut and passing the vibrated blade through the material.

FIGS. 3 and 4 illustrate a preferred ultrasonic cutting device and method according to the present invention, wherein a plurality of parallel cutting blades are vibrated in a direction transverse to their respective plane of passage through the workpiece to be cut. As shown in FIG. 3, the ultrasonic vibrating means 12 generates ultrasonic vibrations in the longitudinal direction E-F. The ultrasonic vibrating means 12 is in the form of a mother horn, and has a front face 14 which is vibrated at ultrasonic frequency in the longitudinal direction E-F. Connected to the front face 14, which represents an anti-node of the vibrating means 12, are a plurality of support members 16a, 16b, 16c and 16d, which extend away from the front face 14 in the longitudinal direction of vibrations E-F.

Mounted at spaced intervals on the support members 16a, 16b, 16c and 16d are a plurality of cutting blades 18a, 18b, 18c and 18d. The cutting blades 18a, 18b, 18c and 18d are parallel to one another, and extend from their respective support members 16a, 16b, 16c and 16d at right angles to the longitudinal axis of vibrations E-F passing from the front face 14 of the ultrasonic vibrating means 12 through the support members 16a, 16b, 16c and 16d.

As shown in FIG. 3, support members 16b and 16c are connected to the front face 14 of the ultrasonic vibrating means 12 through the intermediary of node-/anti-node displacement members having reduced mass 20b and 20c, whereby the anti-node succeeding the front face 14 is displaced in a direction toward the front face 14. As shown in FIGS. 3 and 4, support member 16d is connected to the front face 14 through the intermediary of a node/anti-node displacement, device having added mass 20d, whereby the succeeding anti-node is displaced in a direction away from the front face 14.

Thus, a plurality of spaced parallel blades may be connected to a plurality of vibrated support members at anti-nodes, providing a multi-blade assembly in which the blades are uniformly staggered in a direction away from the front face of the ultrasonic vibrating means, In operation, the spaced parallel blades are vibrated in a direction perpendicular to the longitudinal axis of vibrations as they are passed through the workpiece, simultaneously providing a plurality of cut lines, as shown in FIG. 4.

FIG. 5 illustrates an alternative embodiment of the ultrasonic cutting device and cutting method of the present invention. As shown in FIG. 5, the cutting blade is connected to an ultrasonic vibrating device comprising means for rotating the vibrated cutting blade while the blade is passed through the workpiece.

The ultrasonic cutting device and cutting method shown in FIG. 5 incorporates a machine tool of the type disclosed in U.K. Patent Application No. 8709236, in which an ultrasonic vibrating support member is simultaneously rotated and is capable of multi-axis orientation relative to a workpiece and is capable of movement to the workpiece in a plurality of orthogonal axes, such as in a robotic arm. The cutting device shown in FIG. 5 comprises a housing 34 containing an ultrasonic subassembly 38 connected to the rotatable drive spindle 80 of a machine tool 58. The ultrasonic subassembly 38 includes a transducer 40, a booster 42, and a horn 54. The ultrasonic subassembly 38 generates a longitudinal axis of vibrations in the direction E-F. A cutting blade 48 is connected to an end portion of the horn 54 at a vibrational antinode. The cutting blade 48 thus extends at right angles to the longitudinal axis of vibrations traveling in the direction E-F.

According to the ultrasonic cutting device and method of the present invention shown in FIG. 5, a cutting blade is passed through a material while ultrasonically vibrating the blade transverse to the plane of passage of the blade through the material and simultaneously rotating the vibrated blade while passing the blade through the material. In operation, the ultrasonic cutting device shown in FIG. 5 provides rotation of the cutting blade 48 while the blade is vibrated at right angles to the longitudinal axis of vibrations. The vibrated and rotated cutting blade may be moved in any desired manner in relation to an article to be cut.

The foregoing description and illustration of the present invention are representative in nature, and the present invention may be carried out separately or in combination with other elements.

We claim:

1. An ultrasonic cutting apparatus comprising:
   an ultrasonic vibrating device comprising an ultrasonic vibrating means which, in operation, generates ultrasonic vibrations in a longitudinal direction;
   a plurality of spaced, parallel, longitudinal support members connected to an extending away from the vibrating means in the longitudinal direction of the ultrasonic vibrations; and
   a plurality of cutting blades connected, respectively, to each support member at antinode positions thereof, the cutting blades lying in spaced, parallel, planes which are at right angles to the support member.

2. An ultrasonic cutting device according to claim 1 wherein the cutting blades are uniformly staggered in a direction away from the ultrasonic vibrating means.

3. An ultrasonic cutting device according to claim 1 wherein the cutting blades are connected at their respective mid-portions to the respective support member.

* * * * *

UNITED STATES PATENT AND TRADEMARK OFFICE
CERTIFICATE OF CORRECTION

PATENT NO. : 5,226,343
DATED : July 13, 1993
INVENTOR(S) : Francis F.H. RAWSON, et al.

It is certified that error appears in the above-identified patent and that said Letters Patent is hereby corrected as shown below:

On the title page, at line 6 of the ABSTRACT, "de ice" should be --device--.

Column 4, line 42 [line 7 of claim 1], "an" should be --and--.

Signed and Sealed this

Eighth Day of February, 1994

Attest:

BRUCE LEHMAN

Attesting Officer

Commissioner of Patents and Trademarks